United States Patent [19]
Yamamoto et al.

[11] Patent Number: 5,290,878
[45] Date of Patent: Mar. 1, 1994

[54] BUTADIENE COPOLYMER AND PROCESS FOR PREPARING SAME

[75] Inventors: Keisaku Yamamoto; Kizuku Wakatsuki; Mitsuji Tsuji, all of Ichihara; Yuichi Saito, Kobe, all of Japan

[73] Assignee: Sumitomo Chemical Company, Limited, Osaka, Japan

[21] Appl. No.: 72,488

[22] Filed: Jun. 7, 1993

[30] Foreign Application Priority Data

Jun. 10, 1992 [JP] Japan .................. 4-150432

[51] Int. Cl.$^5$ ............................................ C08F 8/42
[52] U.S. Cl. ............................ 525/332.2; 525/332.1; 525/342; 525/359.1; 525/359.5; 525/370; 525/371; 524/572; 526/336
[58] Field of Search ............... 525/332.1, 332.2, 332.3, 525/359.1, 359.5, 370, 371, 342; 524/572; 526/340, 336, 173

[56] References Cited

U.S. PATENT DOCUMENTS 3,280,084 10/1966 Zelinski et al. .
4,482,678 11/1984 Furukawa et al. .......... 525/332.9 X
4,742,124 5/1988 Tsutsumi et al. ............ 525/332.2 X

FOREIGN PATENT DOCUMENTS 39-17074 8/1964 Japan .
45-18671 6/1970 Japan .

*Primary Examiner*—Fred Teskin
*Attorney, Agent, or Firm*—Armstrong, Westerman, Hattori, McLeland & Naughton

[57] ABSTRACT

An elastomeric butadiene copolymer prepared by a process which comprises copolymerizing butadiene, a polyvinyl aromatic compound and optionally styrene in a hydrocarbon solvent in the presence of an organolithium polymerization initiator and subjecting the resulting copolymer having lithium at the polymer end or ends to a coupling reaction with a trifunctional or tetrafunctional coupling agent, said butadiene copolymer satisfying the following conditions: (a) the content of styrene is at most 50% by weight, (b) the content of vinyl bonds in the butadiene portion is from 10 to 90% by weight, (c) the molecular weight distribution curve obtained by a high performance liquid chromatography has at least three peaks, and 5 to 60% by weight of all the polymer chains have a molecular weight which is at least 5 times the molecular weight in terms of standard polystyrene corresponding to the peak appearing on the lowest molecular weight side of the high performance liquid chromatogram, and (d) the Mooney viscosity ($ML_{1+4}$, 100° C.) is from 30 to 200. The butadiene copolymer has an improved processability with excellent resilience, wet grip property, abrasion resistance and mechanical properties, and is suitable for tire use.

23 Claims, No Drawings

BUTADIENE COPOLYMER AND PROCESS FOR PREPARING SAME

BACKGROUND OF THE INVENTION

The present invention relates to a butadiene copolymer, and more particularly to a butadiene copolymer suitable for use in tires, which is remarkably improved in processability with keeping resilience, wet grip property, abrasion resistance and mechanical properties on high levels.

A rubber well known as a rubber for tires is an emulsion styrene-butadiene copolymer prepared by an emulsion polymerization. However, this copolymer has the disadvantage of being poor in resilience and, therefore, it is not preferable from the viewpoint of energy saving.

Natural rubber, polyisoprene rubber and high-cis polybutadiene rubber are known as rubbers having a good resilience. However, these rubbers are poor in wet grip property, and accordingly are not preferable from the viewpoint of running stability on wet roads.

As a rubber having both good resilience and good wet grip property, there is known a rubber prepared by polymerizing butadiene alone, or butadiene and styrene, in a hydrocarbon solvent in the presence of an organolithium compound as the polymerization initiator and a Lewis base such as an ether compound or a tertiary amine as an agent for controlling microstructure. However, this rubber has the deficiency that the processability is insufficient. In order to improve the processability, it is also proposed to convert the polymer into a branched polymer by acting a tri- or tetrafunctional coupling agent on the active ends of the polymer. However, the processability is not sufficiently improved even by this method. In particular, in case of processing the rubber by a method using a large amount of a filler which is adopted in producing automobile tires superior in high speed running characteristics, the processability is unsatisfactory.

Abrasion resistance and mechanical properties are also required as the characteristics of rubbers for tire use in addition to the above-mentioned resilience, wet grip property and processability. However, any rubber which satisfies all of these characteristics, has not been proposed.

It is an object of the present invention to provide a rubber suitable for use in tires and having excellent general characteristics required for tire use.

A further object of the present invention is to provide a butadiene copolymer suitable as a tire rubber, which is remarkably improved in processability with keeping resilience, wet grip property, abrasion resistance and mechanical properties on high levels.

A still further object of the present invention is to provide a process for preparing the above-mentioned butadiene copolymer.

Another object of the present invention is to provide a rubber composition suitable for producing tires such as automobile tires and having an excellent processability.

A still another object of the present invention is to provide a tire having excellent characteristics such as resilience, wet grip property, abrasion resistance and mechanical properties.

These and other objects of the present invention will become apparent from the description hereinafter.

SUMMARY OF THE INVENTION

In accordance with the present invention, there is provided a butadiene copolymer prepared by a process which comprises copolymerizing a mixture of butadiene and a polyvinyl aromatic compound or a mixture of butadiene, styrene and a polyvinyl aromatic compound in a hydrocarbon solvent in the presence of an organolithium compound as a polymerization initiator and subjecting the resulting copolymer having lithium at the polymer end to a coupling reaction with a trifunctional or tetrafunctional coupling agent, said butadiene copolymer satisfying the following conditions (a) to (d):

(a) the content of styrene is at most 50% by weight, (b) the content of vinyl bonds in the butadiene portion is from 10 to 90% by weight, (c) the molecular weight distribution curve obtained by a high performance liquid chromatography has at least three peaks, and 5 to 60% by weight of all the polymer chains have a molecular weight which is at least 5 times the molecular weight in terms of standard polystyrene corresponding to the peak appearing on the lowest molecular weight side of the chromatogram, and (d) the Mooney viscosity ($ML_{1+4}$, 100° C.) is from 30 to 200.

DETAILED DESCRIPTION

The copolymerization is carried out according to a known living anionic polymerization procedure.

Examples of the hydrocarbon solvent used in the polymerization are, for instance, aromatic hydrocarbons such as benzene, toluene, xylene and ethylbenzene, aliphatic hydrocarbons such as hexane and heptane, and alicyclic hydrocarbons such as cyclopentane, cyclohexane and methylcyclohexane.

Organolithium compounds known as anionic polymerization initiators of one end initiation type or both ends initiation type can be used. Representative examples are, for instance, ethyllithium, propyllithium, butyllithium, amyllithium, trimethylenedilithium, tetramethylenedilithium, hexyllithium, cyclohexyllithium, phenyllithium, tolyllithium and naphthyllithium.

Examples of the polyvinyl aromatic compound used in the present invention are, for instance, divinylbenzene, 1,2,4-trivinylbenzene, 1,3-divinylnaphthalene, 1,8-divinylnaphthalene, 1,2-divinyl-3,4-dimethylbenzene, 2,4-divinylbiphenyl, 3,5,4'-trivinylbiphenyl, 1,3,5-trivinylbenzene, and the like. The polyvinyl aromatic compounds may be used alone or in admixture thereof. Among them, divinylbenzene is preferable from the viewpoint of easiness in industrial availability, and a mixture of the ortho, meta and para compounds which is industrially available, can be used.

Known trifunctional or tetrafunctional coupling agents can be used in the present invention. Examples of the coupling agent are, for instance, silicon tetrachloride, silicon tetrabromide, silicon tetraiodide, germanium tetrachloride, tin tetrachloride, methyltrichlorosilane, butyl tin trichloride, bistrichlorosilylethane and bistrichloroethane. The coupling agents may be used alone or in admixture thereof. Silicon tetrachloride and tin tetrachloride are preferred from the viewpoints of reactivity and industrial availability.

The butadiene copolymers of the present invention contain units derived from butadiene, units derived from the polyvinyl aromatic compound and optionally units derived from styrene. The content of the styrene units in the copolymers is at most 50% by weight, whereby an elasticity as a rubber is secured.

The content of vinyl bonds in the butadiene moiety of the butadiene copolymers is from 10 to 90% by weight, preferably from 20 to 70% by weight. The copolymers outside the above range are difficult to industrially produce.

The content of cis-1,4 bonds in the butadiene moiety of the copolymers is usually from 5 to 40% by weight. Also, the content of trans-1,4 bonds in the butadiene moiety is usually from 10 to 60% by weight.

The molecular weight distribution curve of the butadiene copolymer of the present invention obtained by a high performance liquid chromatography, wherein the axis of ordinates is weight fraction and the axis of abscissas is molecular weight, has at least three peaks. In the region of molecular weight of not less than 100,000 in terms of standard polystyrene, it is necessary that the proportion of high molecular weight polymer chains having a molecular weight which is equal to 5 times or more the molecular weight in terms of standard polystyrene corresponding to the top of a peak which appears on the lowest molecular weight side of the chromatogram, is from 5 to 60% by weight, preferably 10 to 40% by weight, based on the entire butadiene copolymer. When the content of the above-defined higher molecular weight polymer chains in the butadiene copolymer is too large or is too small, effect on the processability according to the present invention is not exhibited.

The Mooney viscosity ($ML_{1+4}$, 100° C.) of the butadiene copolymer is from 30 to 200, preferably 50 to 150. When the Mooney viscosity is more than the above range, the state of mixing in the preparation of a rubber composition by mixing the copolymer with additives is deteriorated. When the Mooney viscosity is less than the above range, the resilience characteristic is deteriorated.

The butadiene copolymer of the present invention may be an oil extended butadiene copolymer containing at most 100 parts by weight of an oil extender per 100 parts by weight of the copolymer. The oil extended butadiene copolymer is superior in workability in the case where a large amount of a process oil must be added in the preparation of rubber compositions.

The elastomeric butadiene copolymer of the present invention is suitably prepared by a process which comprises copolymerizing butadiene, a polyvinyl aromatic compound and optionally styrene in a hydrocarbon solvent in the presence of an organolithium compound as a polymerization initiator to produce a copolymer having lithium at either or both polymer chain ends, adding a trifunctional or tetrafunctional coupling agent to the reaction mixture, and carrying out the coupling reaction.

A Lewis basic compound may be used in the polymerization in order to control the content of vinyl bonds in the butadiene moiety of the produced copolymer. Various kinds of Lewis basic compounds can be used, but ether compounds and tertiary amine compounds are preferred from the viewpoint of their availability in industrially practicing the invention. Examples of the ether compounds are, for instance, cyclic ethers such as tetrahydrofuran, tetrahydropyran and 1,4-dioxane; aliphatic monoethers such as diethyl ether and dibutyl ether; aliphatic polyethers such as ethyleneglycol dimethyl ether, ethyleneglycol diethyl ether, ethyleneglycol dibutyl ether, diethyleneglycol diethyl ether and diethyleneglycol dibutyl ether; aromatic ethers such as diphenyl ether and anisole, and the like. Examples of the tertiary amine compounds are, for instance, triethylamine, tripropylamine, tributylamine, and other compounds such as N,N,N',N'-tetramethylethylenediamine, N,N-diethylaniline, pyridine and quinoline, and the like, The polymerization temperature varies depending on the desired microstructure of the copolymer to be produced. Preferably, it is selected from 0° to 150° C., especially from 30° to 80° C., from the viewpoints of economy and side reaction.

The amount of the polyvinyl aromatic compound is usually from 0.05 to 1 mole, preferably 0.1 to 0.6 mole, per mole of the organolithium initiator. When the amount is less than the above range, copolymers having the molecular weight distribution according to the present invention are not obtained, and the obtained copolymers are poor in processability. When the amount is more than the above range, the viscosity of the polymerization solution remarkably increases, thus the controllability in the production is lowered, and also undesirable side reactions such as gellation occur. The whole amount of the polyvinyl aromatic compound may be added to the polymerization system in the initial stage of the polymerization. Alternatively, the polyvinyl aromatic compound may be gradually added to the system in a continuous or intermittent manner during the polymerization. Further, a part of the compound may be used after the coupling reaction with a tri- or tetrafunctional coupling agent.

The amount of the trifunctional or tetrafunctional coupling agent is usually from 0.03 to 0.3 mole, preferably from 0.05 to 0.2 mole, per mole of the organolithium initiator. When the amount of the coupling agent is less than the above range, copolymers having the molecular weight distribution defined above of the present invention are not obtained, and the obtained copolymers are poor in processability. When the amount is more than the above range, the effect of improving the processability reaches maximum and does not increase even if the amount is increased, thus economically disadvantageous.

The butadiene copolymer of the present invention may be used alone or in combination with other synthetic rubbers and/or natural rubber as a rubber component for rubber compositions. The rubber compositions may contain known various additives, e.g., a reinforcing agent such as carbon black or silica, a filler such as calcium carbonate or talc, a plasticizer, a curing accelerator, a curing agent, and an antioxidant.

The butadiene copolymer of the present invention can be used as a rubber for various purposes, and is particularly suitable for use in tires. The tires according to the present invention have excellent characteristics in all of resilience, wet grip characteristic, abrasion resistance and mechanical properties.

The butadiene copolymer of the present invention has features as explained above. The most important feature of them is that the copolymer has the characteristic molecular weight distribution as defined above. This feature is obtained only when a polyvinyl aromatic compound and a trifunctional or tetrafunctional coupling agent are used. The butadiene copolymer having the specific molecular weight distribution according to the present invention cannot be obtained by the use of either one of the polyvinyl aromatic compound and the trifunctional or tetrafunctional coupling agent.

The present invention is more specifically described and explained by means of the following Examples and Comparative Examples, in which all % and parts are by weight unless otherwise noted.

In the following Examples and Comparative Examples, properties were measured as follows:

(1) Styrene content

The bound styrene content was measured by a refractive index method.

(2) Contents of vinyl bonds, cis-1,4 bonds and trans-1,4 bonds in butadiene moiety The contents were measured by infrared spectroscopy.

(3) Molecular weight distribution curve (Content of specific high molecular weight polymer chains)

A high performance liquid chromatograph HLC-TWINCLE made by Nippon Bunkoh Kogyo Kabushiki Kaisha was used. Also, a column Shodex 80M made by Showa Denko Kabushiki Kaisha was used as a distribution column, and a UV meter was used as a detector. A molecular weight distribution of a copolymer was measured at room temperature by using tetrahydrofuran as a developing solvent to obtain a molecular weight distribution curve (a high performance liquid chromatogram) wherein the axis of ordinate is weight fraction and the axis of abscissa is molecular weight. The weight proportion based on the whole polymer chains (namely content expressed by weight % in the copolymer) of polymer chains having a molecular weight of at least 5 times the molecular weight (in terms of standard polystyrene) which corresponds to the top of the peak located on the lowest molecular weight side of the chromatogram was measured. In the measurement, a calibration curve showing the relationship between retention times and molecular weights was prepared using standard polystyrenes made by Tosoh Corporation, namely polystyrene A-2500 having weight average molecular weight $2.8 \times 10^3$, polystyrene F-10 having weight average molecular weight $1.06 \times 10^5$ and polystyrene F-128 having weight average molecular weight $1.30 \times 10^6$. The molecular weight of a sample copolymer in terms of standard polystyrene was obtained from the calibration curve.

(4) Roll processability

Temperature of 6 inch rolls was adjusted to 70° C. A sample mixture obtained by mixing the following ingredients by a Banbury mixer was kneaded on the rolls with changing the roll spacing to 0.7 mm, 1.0 mm, 1.5 mm and 2.0 mm. The state of winding of the sample mixture on the rolls was visually observed and estimated according to the following criteria.

| Sample mixture | |
|---|---|
| Copolymer | 100 parts |
| Aromatic oil | 50 parts |
| Stearic acid | 2 parts |
| Sulfur | 2 parts |
| Carbon black | 90 parts |
| Zinc oxide | 3 parts |
| Curing accelerator (N-cyclohexyl-2-benzothiazylsulfenamide) | 1 part |
| SUNNOC N (special wax made by Ohuchi Shinko Kabushiki Kaisha) | 2 parts |
| Antioxidant (N-phenyl-N'-isopropyl-p-phenylenediamine) | 2 parts |

Estimation

5: Winding state is very good, sheet skin is smooth and sheet has a tackiness.

4: Winding state is good, but sheet edge breaking occurs or sheet skin is somewhat rough.

3: Rubber sheet wound on the roll is lacking in tackiness, or biting into rolls of bank is somewhat bad.

2: Bagging and sheet breaking occur.

1: Biting into rolls in an initial stage is bad, and the mixture is not formed into a sheet and is not wound round the roll.

(5) Physical properties of cured product

The mixture obtained according to the above formulation was press-cured at 160° C. for 30 minutes, and the obtained cured product was used for the following measurement of physical properties.

Resilience was measured at 60° C. using a Lüpke resilience tester.

Wet grip index was measured using a portable skid resistance tester made by Stanley Co., Ltd. with respect to a cured rubber sheet having a thickness of 6.5 mm. An asphalt surface sprayed with water of 20° C. was used as the contact road surface.

Other properties, namely tensile strength, elongation and abrasion resistance, were measured according to JIS K 6301.

EXAMPLE 1

A 20 liter stainless steel polymerization vessel was replaced with dry nitrogen, and it was charged with 1,400 g of 1,3-butadiene, 600 g of styrene, 9,900 g of n-hexane, 80 g of tetrahydrofuran, 10 millimoles of n-butyllithium dissolved in n-hexane and 0.8 millimole of divinylbenzene. The polymerization was carried out at 65° C. for 4 hours with stirring.

After the completion of the polymerization, 1.7 millimoles of silicon tetrachloride was added to the reaction mixture, and the reaction was carried out for 30 minutes with stirring. To the reaction mixture was added 10 ml of methanol, and the reaction mixture was further stirred for 5 minutes.

The reaction mixture was then taken out of the polymerization vessel. To the reaction mixture were added 10 g of 2,6-di-t-butyl-p-cresol (Sumilizer® BHT, product of Sumitomo Chemical Co., Ltd.) and 750 g of aromatic oil. A large portion of n-hexane was evaporated by steam stripping followed by drying under reduced pressure at 50° C. for 20 minutes to give a copolymer.

The polymerization conditions are shown in Table 1.

The structure of the copolymer and the results of the estimation of the copolymer are shown in Table 2.

EXAMPLES 2 to 9 and COMPARATIVE EXAMPLES 1 to 8

The procedure of Example 1 was repeated except that the polymerization conditions (ingredients) were changed as shown in Table 1.

The structures of the obtained copolymers and the results of the estimation thereof are shown in Table 2.

It is observed in Table 2 that all copolymers obtained in the Examples which satisfy the requirements of the present invention, show satisfactory results in all items of the estimation, particularly show that they have a very excellent roll processability, whereas the copolymers obtained in the Comparative Examples which do not have the specific molecular weight distribution defined in the present invention, are poor in roll processability.

It is understood that according to the present invention the processability of butadiene copolymer rubbers is remarkably improved with keeping resilience, wet grip property, abrasion resistance and mechanical properties on high levels, thus the present invention provides butadiene copolymer rubbers suitable for use in tires.

TABLE 1

| | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|
| n-Hexane (g) | 9900 | 9900 | 9900 | 9900 | 9900 | 9900 | 9900 | 9900 | 9900 |
| 1,3-Butadiene (g) | 1400 | 1400 | 1400 | 1400 | 1400 | 1400 | 1400 | 1400 | 1400 |
| Styrene (g) | 600 | 600 | 600 | 600 | 600 | 600 | 600 | 600 | 600 |
| Tetrahydrofuran (g) | 80 | 80 | 80 | 80 | 80 | 80 | 80 | 80 | 80 |
| n-Butyllithium (millimole) | 10.0 | 12.2 | 14.3 | 10.0 | 16.7 | 8.0 | 9.0 | 12.5 | 8.0 |
| Divinylbenzene (millimole) | 0.8 | 1.6 | 3.2 | 3.1 | 7.7 | — | 9.0 | 62.5*[1] | 9.0 |
| Molar ratio of divinylbenzene/n-butyllithium | 0.08 | 0.13 | 0.22 | 0.31 | 0.46 | — | 1.0 | 5.0 | 1.1 |
| $SiCl_4$ (millimole) | 1.7 | 2.1 | 2.4 | 1.7 | 2.8 | 1.4 | — | — | 1.4 |
| Molar ratio of $SiCl_4$/n-butyllithium | 0.17 | 0.17 | 0.17 | 0.17 | 0.17 | 0.17 | — | — | 0.17 |
| Aromatic oil (g) | 750 | 750 | 750 | 750 | 750 | 750 | 750 | 750 | 750 |

| | Ex. 6 | Com. Ex. 5 | Ex. 7 | Com. Ex. 6 | Ex. 8 | Com. Ex. 7 | Ex. 9 | Com. Ex. 8 |
|---|---|---|---|---|---|---|---|---|
| n-Hexane (g) | 9900 | 9900 | 9900 | 9900 | 9900 | 9900 | 9900 | 9900 |
| 1,3-Butadiene (g) | 1700 | 1700 | 1700 | 1700 | 1300 | 1300 | 1100 | 1100 |
| Styrene (g) | 300 | 300 | 300 | 300 | 700 | 700 | 900 | 900 |
| Tetrahydrofuran (g) | 38 | 38 | 320 | 320 | 320 | 320 | 86 | 86 |
| n-Butyllithium (millimole) | 16.7 | 7.5 | 17.0 | 7.2 | 11.1 | 7.0 | 11.6 | 8.4 |
| Divinylbenzene (millimole) | 3.1 | — | 3.0 | — | 3.1 | — | 2.9 | — |
| Molar ratio of divinylbenzene/n-butyllithium | 0.19 | — | 0.18 | — | 0.28 | — | 0.25 | — |
| $SiCl_4$ (millimole) | 2.8 | 1.3 | 2.8 | 1.2 | 1.9 | 1.2 | 1.9 | 1.4 |
| Molar ratio of $SiCl_4$/n-butyllithium | 0.17 | 0.17 | 0.16 | 0.17 | 0.17 | 0.17 | 0.16 | 0.17 |
| Aromatic oil (g) | 750 | 750 | 750 | 750 | 1000 | 1000 | 750 | 750 |

*[1]Divinylbenzene was used as a coupling agent in the coupling reaction after the polymerization.

TABLE 2

| | Ex. 1 | Ex. 2 | Ex. 3 | Ex. 4 | Ex. 5 | Com. Ex. 1 | Com. Ex. 2 | Com. Ex. 3 | Com. Ex. 4 |
|---|---|---|---|---|---|---|---|---|---|
| Polymer structure | | | | | | | | | |
| Styrene content (%) | 30 | 30 | 30 | 30 | 30 | 30 | 30 | 30 | *4 |
| Butadiene moiety | | | | | | | | | |
| Vinyl bond content (%) | 40 | 40 | 40 | 40 | 40 | 40 | 40 | 40 | |
| Cis-1,4 bond content (%) | 23 | 23 | 23 | 23 | 23 | 23 | 23 | 23 | |
| Trans-1,4 bond content (%) | 37 | 37 | 37 | 37 | 37 | 37 | 37 | 37 | |
| Number of peaks*[1] | 3 | 3 | 3 | 3 | 4 | 2 | 2 | 2 | |
| Content of specific high molecular weight polymer chains*[2] (%) | 8 | 14 | 30 | 35 | 30 | 1 | 0 | 67 | |
| Mooney viscosity ($ML_{1+4}$, 100° C.) | 50 | 45 | 60 | 84 | 70 | 50 | 45 | 58 | |
| Estimation | | | | | | | | | |
| Roll processability | 4 | 4 | 5 | 5 | 5 | 2 | 2 | 2 | |
| Physical properties of cured product | | | | | | | | | |
| Tensile strength at 300% elongation (kg/cm$^2$) | 90 | 99 | 112 | 108 | 100 | 95 | 90 | 93 | |
| Tensile strength at break (kg/cm$^2$) | 180 | 192 | 193 | 204 | 195 | 185 | 180 | 170 | |
| Elongation (%) | 550 | 560 | 520 | 530 | 540 | 560 | 600 | 550 | |
| Resilience (%) | 36 | 35 | 36 | 35 | 36 | 34 | 33 | 34 | |
| Wet grip index*[3] | 100 | 100 | 99 | 99 | 100 | 100 | 100 | 100 | |
| Abrasion resistance*[3] | 101 | 100 | 100 | 96 | 100 | 100 | 109 | 122 | |

| | Ex. 6 | Com. Ex. 5 | Ex. 7 | Com. Ex. 6 | Ex. 8 | Com. Ex. 7 | Ex. 9 | Com. Ex. 8 |
|---|---|---|---|---|---|---|---|---|
| Polymer structure | | | | | | | | |
| Styrene content (%) | 15 | 15 | 15 | 15 | 35 | 35 | 45 | 45 |
| Butadiene moiety | | | | | | | | |
| Vinyl bond content (%) | 40 | 40 | 69 | 68 | 50 | 50 | 30 | 30 |
| Cis-1,4 bond content (%) | 23 | 23 | 10 | 10 | 20 | 20 | 28 | 28 |
| Trans-1,4 bond content (%) | 37 | 37 | 21 | 22 | 30 | 30 | 42 | 42 |
| Number of peaks*[1] | 3 | 2 | 3 | 2 | 3 | 2 | 3 | 2 |
| Content of specific high molecular weight polymer chains*[2] (%) | 24 | 0 | 25 | 0 | 24 | 4 | 21 | 1 |
| Mooney viscosity ($ML_{1+4}$, 100° C.) | 45 | 50 | 50 | 56 | 55 | 55 | 45 | 50 |
| Estimation | | | | | | | | |
| Roll processability | 5 | 3 | 5 | 3 | 4 | 2 | 4 | 2 |
| Physical properties of cured product | | | | | | | | |
| Tensile strength at 300% elongation (kg/cm$^2$) | 99 | 93 | 93 | 90 | 115 | 106 | 110 | 107 |

TABLE 2-continued

| | | | | | | | | |
|---|---|---|---|---|---|---|---|---|
| Tensile strength at break (kg/cm$^2$) | 185 | 185 | 180 | 176 | 196 | 194 | 190 | 189 |
| Elongation (%) | 540 | 550 | 520 | 530 | 530 | 550 | 510 | 520 |
| Resilience (%) | 37 | 37 | 34 | 33 | 28 | 28 | 30 | 29 |
| Wet grip index*[3] | 100 | 100 | 101 | 100 | 100 | 100 | 100 | 100 |
| Abrasion resistance*[3] | 99 | 100 | 100 | 100 | 101 | 100 | 100 | 100 |

(Notes in Table 2)
*[1] Number of the peaks of a molecular weight distribution curve (ordinate: weight fraction, abscissa: molecular weight) obtained by high performance liquid chromatography
*[2] Weight proportion, based on the whole polymer chains, of polymer chains having a molecular weight which is equal to 5 times or more the molecular weight in terms of standard polystyrene which corresponds to the position of the top of the peak located on the lowest molecular weight side of a molecular weight distribution curve obtained by high performance liquid chromatography
*[3] Indexes of values of Examples 1 to 5 and Comparative Examples 2 to 4 to value of Comparative Example 1; index of value of Example 6 to value of Comparative Example 5; index of value of Example 7 to value of Comparative Example 6; index of value of Example 8 to value of Comparative Example 7; and index of value of Example 9 to value of Comparative Example 8
*[4] The viscosity remarkably increased immediately after adding silicon tetrachloride and the stirring became impossible and, therefore, the procedure could not be further continued.

In addition to the ingredients used in the Examples, other ingredients can be used in the Examples as set forth in the specification to obtain substantially the same results.

What we claim is:

1. A butadiene copolymer prepared by a process which comprises copolymerizing a mixture of butadiene and a polyvinyl aromatic compound or a mixture of butadiene, styrene and a polyvinyl aromatic compound in a hydrocarbon solvent in the presence of an organolithium compound as a polymerization initiator and subjecting the resulting copolymer having lithium at the polymer end to a coupling reaction with a trifunctional or tetrafunctional coupling agent, said butadiene copolymer satisfying the following conditions (a) to (d):
   (a) the content of styrene is at most 50% by weight,
   (b) the content of vinyl bonds in the butadiene portion is from 10 to 90% by weight,
   (c) the molecular weight distribution curve obtained by a high performance liquid chromatography has at least three peaks, and 5 to 60% by weight of all the polymer chains have a molecular weight which is at least 5 times the molecular weight in terms of standard polystyrene corresponding to the peak appearing on the lowest molecular weight side of the high performance liquid chromatogram, and
   (d) the Mooney viscosity (ML$_{1+4}$, 100° C.) is from 30 to 200.

2. The copolymer of claim 1, wherein the proportion (c) of polymer chains having a molecular weight of at least 5 times the molecular weight in terms of standard polystyrene which corresponds to the peak located on the lowest molecular weight side of the high performance liquid chromatogram is from 10 to 40% by weight based on the entire of said copolymer.

3. The copolymer of claim 1, wherein said hydrocarbon solvent is at least one member selected from the group consisting of benzene, toluene, xylene, ethylbenzene, hexane, heptane, cyclopentane, cyclohexane and methylcyclohexane.

4. The copolymer of claim 1, wherein said organolithium compound is at least one member selected from the group consisting of ethyllithium, propyllithium, butyllithium, amyllithium, trimethylenedilithium, tetramethylenedilithium, hexyllithium, cyclohexyllithium, phenyllithium, tolyllithium and naphthyllithium.

5. The copolymer of claim 1, wherein said polyvinyl aromatic compound is at least one member selected from the group consisting of divinylbenzene, 1,2,4-trivinylbenzene, 1,3-divinylnaphthalene, 1,8-divinylnaphthalene, 1,2-divinyl-3,4-dimethylbenzene, 2,4-divinylbiphenyl, 3,5,4'-trivinylbiphenyl and 1,3,5-trivinylbenzene.

6. The copolymer of claim 1, wherein said trifunctional or tetrafunctional coupling agent is at least one member selected from the group consisting of silicon tetrachloride, silicon tetrabromide, silicon tetraiodide, germanium tetrachloride, tin tetrachloride, methyltrichlorosilane, butyl tin trichloride, bistrichlorosilylethane and bistrichloroethane.

7. The copolymer of claim 1, wherein said content of vinyl bonds in the butadiene portion is from 20 to 70%.

8. The copolymer of claim 1, wherein said Mooney viscosity (ML$_{1+4}$, 100° C.) is from 50 to 150.

9. The copolymer of claim 1, which is an oil extended butadiene copolymer containing at most 100 parts by weight of an oil extender per 100 parts by weight of the butadiene copolymer.

10. A process for preparing the butadiene copolymer of claim 1, which comprises copolymerizing a mixture of butadiene and a polyvinyl aromatic compound or a mixture of butadiene, styrene and a polyvinyl aromatic compound in a hydrocarbon solvent in the presence of an organolithium compound as a polymerization initiator, and subjecting the resulting copolymer having lithium at the polymer end to a coupling reaction with a trifunctional or tetrafunctional coupling agent.

11. The process of claim 10, wherein said hydrocarbon solvent is at least one member selected from the group consisting of benzene, toluene, xylene, ethylbenzene, hexane, heptane, cyclopentane, cyclohexane and methylcyclohexane.

12. The process of claim 10, wherein said organolithium compound is at least one member selected from the group consisting of ethyllithium, propyllithium, butyllithium, amyllithium, trimethylenedilithium, tetramethylenedilithium, hexyllithium, cyclohexyllithium, phenyllithium, tolyllithium and naphthyllithium.

13. The process of claim 10, wherein said polyvinyl aromatic compound is at least one member selected from the group consisting of divinylbenzene, 1,2,4-trivinylbenzene, 1,3-divinylnaphthalene, 1,8-divinylnaphthalene, 1,2-divinyl-3,4-dimethylbenzene, 2,4-divinylbiphenyl, 3,5,4'-trivinylbiphenyl and 1,3,5-trivinylbenzene.

14. The process of claim 10, wherein said trifunctional or tetrafunctional coupling agent is at least one member selected from the group consisting of silicon tetrachloride, silicon tetrabromide, silicon tetraiodide, germanium tetrachloride, tin tetrachloride, methyltrichlorosilane, butyl tin trichloride, bistrichlorosilylethane and bistrichloroethane.

15. The process of claim 10, wherein the copolymerization is carried out in the presence of a Lewis basic compound as an agent for controlling the vinyl bond content in the butadiene portion.

16. The process of claim 15, wherein said Lewis basic compound is an ether compound or a tertiary amine compound.

17. The process of claim 15, wherein said Lewis basic compound is at least one member selected from the group consisting of tetrahydrofuran, tetrahydropyran, 1,4-dioxane, diethyl ether, dibutyl ether, ethyleneglycol dimethyl ether, ethyleneglycol diethyl ether, ethyleneglycol dibutyl ether, diethyleneglycol diethyl ether, diethyleneglycol dibutyl ether, diphenyl ether, anisole, triethylamine, tripropylamine, tributylamine, N,N,N',N'-tetramethylethylenediamine, N,N-diethylaniline, pyridine and quinoline.

18. The process of claim 10, wherein the polymerization temperature is from 0° to 150° C.

19. The process of claim 10, wherein the polymerization temperature is from 30° to 80° C..

20. The process of claim 10, wherein the amount of said polyvinyl aromatic compound is from 0.05 to 1.0 mole per mole of said organolithium compound initiator.

21. The process of claim 10, wherein the amount of said polyvinyl aromatic compound is from 0.1 to 0.6 mole per mole of said organolithium compound initiator.

22. The process of claim 10, wherein the amount of said trifunctional or tetrafunctional coupling agent is from 0.03 to 0.3 mole per mole of said organolithium compound initiator.

23. The process of claim 10, wherein the amount of said trifunctional or tetrafunctional coupling agent is from 0.05 to 0.2 mole per mole of said organolithium compound initiator.

* * * * *